July 22, 1958 T. H. MANN ET AL 2,844,665

MAGNETIC RECORDING DEVICE

Filed April 15, 1954

INVENTORS

THEODORE H. MANN

THEODORE G. MANN

BY

Miner L. Hartmann

ATTORNEY

United States Patent Office 2,844,665
Patented July 22, 1958

2,844,665

MAGNETIC RECORDING DEVICE

Theodore H. Mann and Theodore G. Mann, Los Angeles, Calif., assignors to Sound Engineering, Los Angeles, Calif., a partnership Application April 15, 1954, Serial No. 423,456

6 Claims. (Cl. 179—100.2)

This invention relates to a magnetic recording and reproducing device and, in particular, to a magnetic head and support therefor.

One object of the invention is to provide a magnetic sound recording and reproducing device which utilizes the surface of the side walls of angular grooves in the magnetic recording support media to guide the head along spiral, helical or other predetermined paths. Another object is to provide guiding surfaces on a magnetic recording head which are disposed angularly from the face which is impressing or translating the magnetic record. Another object is to provide a tilted head for a magnetic sound recording and reproducing mechanism which is translated across the sound recording surface by following the side walls of angular grooves in the support media. A further object is to provide a recording and reproducing head for a magnetic mechanism which may be adjusted to present its angularly faced recording and guiding surfaces to correspond to indented grooves in the support media for a magnetic recording surface.

These and other objects are attained by our invention which will be understood from the following description, reference being made to the accompanying drawings, in which.

Figure 1:
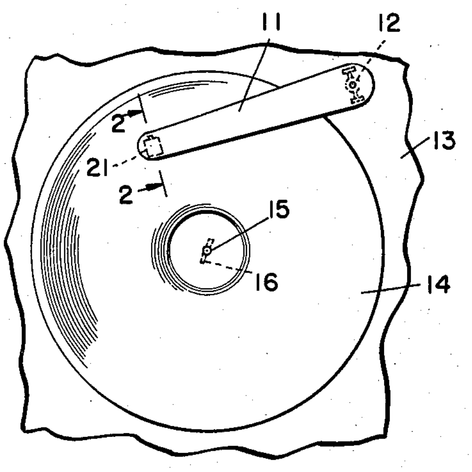
Fig. 1 is a plan view showing a pivoted head supporting arm for a magnetic recording and reproducing mechanism showing a disk having a spiral groove for receiving magnetic impressions.
Figure 2:
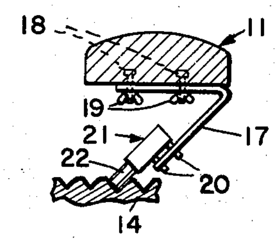
Fig. 2 is a side elevational view, partly in section on the line 2—2, of the device shown in Figure 1.
Figure 3:
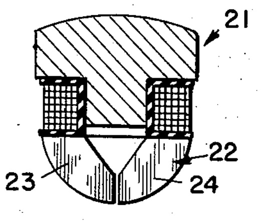
Fig. 3 is a side elevational view of a magnetic recording head.
Figure 4:
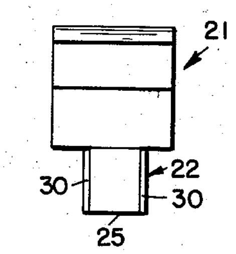
Fig. 4 is a front view of the head of Figure 3, shown in operative position in a groove of the support media.
Figure 5:
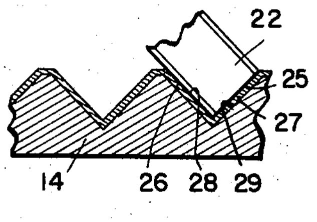
Fig. 5 is a sectional view showing the contacting end of the magnetic head positioned in a groove to make magnetic contact with the righthand side of the groove.
Figure 6:
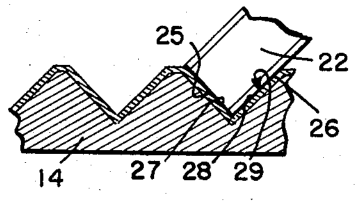
Fig. 6 is a similar view showing the head positioned in a groove to make magnetic contact with the left-hand face of the groove.

Referring to Figures 1 to 6 showing a preferred form of our invention, applicable to a spirally grooved disk, a head-supporting arm 11 is mounted by the pivot connection 12 to a casing 13 which contains the motor drive (not shown) for the preformed grooved recording disk 14. The recording disk 14 is mounted on a drive spindle 15 having securing means 16 thereon to hold the disk securely to the drive spindle. At the free end of the arm 11, there is attached an angle bracket 17 by means of the studs 18, preferably molded in the arm 11, and thumb nuts 19 threadedly attached thereon. The other end of the bracket 17 is provided with attachment screws 20 which threadedly engage the magnetic head 21. The magnetic foot 22 of the head consists of opposed magnetic poles 23 and 24, the magnetic recording-reproducing face 25 being adjacent the wall of the groove to be impressed, and the contacting guide face 26 being one or the other side walls of the foot 22, respectively adjacent the selected magnetically impressionable side wall 27, and the opposite guiding wall 28 of the groove 29 in the recording media or disk 14. The foot 22 of the magnetic head is preferably provided with isolating non-magnetizable laminations 30 on each side of the magnetic core as shown particularly in Figure 4, these laminations 30 shielding the adjacent areas from the magnetic flux, and also making sliding contact with the guide wall 28 of the groove.

The arm 11, which supports the magnetic head, is guided across the face of the disk as the foot 22 follows the preformed groove 29 in the recording disk 14, the guiding contact face 26 sliding upon the guide side wall 28, which may optionally also be provided with magnetic impressible material or surface. By using the one side of the groove 29 as a guiding surface for the head 21, the magnetic recordings are reproduced accurately by the magnetic recording-reproducing face 25, even though a different machine than the original recorder is used.

By changing the position of the mounting bracket 17, the foot 22 of the recorder may be adjusted so that the guide face 26 follows one or the other wall of a groove having walls angularly disposed at approximately 90°. The position of tilting the head may also be reversed so that the recording may be impressed or reproduced upon the opposite side wall of the groove, as shown particularly in Figures 5 and 6.

Figure 7:
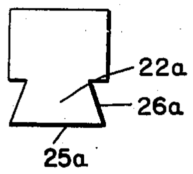
Fig. 7 is a front elevational view of an alternative shaping for the tiltable head for guiding and impression on the side walls of an acute angled groove.
Figure 8:
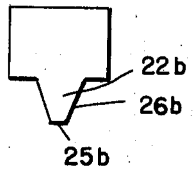
Fig. 8 is a front elevational view of another alternative shaping for the tiltable head for guiding and impression on the side walls of an obtuse angled groove.

When the walls of the record groove are disposed at more acute angles than about 90°, the foot **22*a* may be provided with outwardly flaring walls as shown in Figure 7, so that the magnetic impressing face 25*a* will be parallel to the recording-reproducing side wall of the groove when the guide face 26*a* is sliding upon the opposite or guide wall. Similarly, when the angle between the side walls of the groove are more obtuse than about 90°, the foot 22*b*, as shown in Figure 8, may be provided with inwardly sloping walls, so that the magnetic impressing face 25*b* will be more nearly parallel to the recording-reproducing side wall of the groove when the guide face 26*b* is sliding upon the opposite or guide wall. This adaptation to the angle of the groove may also be accomplished by tapering the isolation lamination 30** when this is used adjacent the magnetic poles.

Figure 9:
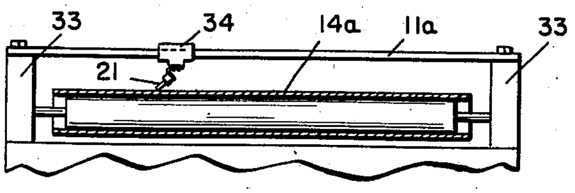
Fig. 9 is a side elevational view of an alternative head-supporting arm for a magnetic recording and reproducing head over a grooved recording belt.

Figure 9 shows an alternative form of our invention in which the supporting arm **11*a* consists of a bar mounted on supports 33 across the recording sleeve 14*a*, the angular position of the magnetic head 21 on the carriage 34 being adjusted so that the head is guided by the side walls of the grooves. The translation of the magnetic head 21 on said bar 11*a* results from the following of the guide contact face 26 upon the side wall 28 of the groove, the carriage 34 being slidably mounted on the arm 11*a***.

While we have shown a commonly used type of magnetic recording and reproducing head, our invention is not limited to the use of this type head, and it is contemplated that other types such as the inductive heads may be used. Also, while we have illustrated our invention as applied to the conventional equilateral grooves in the recording media, our invention is also applicable to non-equilateral groove structures.

The advantages of our invention will be apparent. The use of a tiltable head permits the maximum utilization of the groove surfaces by definitely orienting the head with the translating-guiding wall of the groove, thus assuring accurate tracking by the recording and reproducing movements of the head. Because of the large surface in contact with the guiding face of the walls, the amount of wear is reduced to a minimum, particularly when wear-resisting magnetic shielding laminations are used in the structure of the head. Either one or both of the walls of the groove in the recording body, as well as the flats between grooves, may be magnetically impressed and used for recording and reproduction of sound, thus increasing the sound recording capacity of a magnetic recording medium of given size.

We claim:

1. A recording and reproducing device comprising a magnetic recording and reproducing head having a two-faced contacting foot, one face being a non-activated wear-resisting guide face and the other face of said contacting foot being a magnetic recording-reproducing face, said faces being disposed at an angle to each other, and means to support said head over a grooved body upon which the magnetic record may be impressed.

2. A recording and reproducing device comprising a magnetic recording and reproducing head having a two-faced contacting foot, one face being a non-activated wear-resisting guide face and the other face of said contacting foot being a magnetic recording-reproducing face, said faces being disposed at an angle to each other, a traverse arm arranged to support said head over a grooved body upon which the magnetic record may be impressed, said traverse arm being actuated by the contact of said guide face on one wall of said groove, and means for laterally adjusting the positioning of the foot of said head with reference to one or the other wall of said groove.

3. A magnetic recording and reproducing head having a two-faced contacting foot, one face being a non-activated wear-resisting guide face, and the other face of said contacting foot being a magnetic recording-reproducing face, said faces being disposed at an angle to each other, said angle conforming substantially to the angle between the opposite walls of the angular groove in a record body adapted for use with said head.

4. A recording and reproducing device comprising a magnetic recording and reproducing head having a two-faced contacting foot, one face being a non-activated wear-resisting guide face adapted to rest upon and make surface contact with one wall surface of an angular groove in the surface of a body adapted for a magnetic record, the other face of said contacting foot being a magnetic recording-reproducing face, said face being disposed at an angle to said guide face, said angle conforming substantially to the angle between the opposite walls of the groove in said record body, and a traverse arm arranged to support said head over the said grooved body upon which the magnetic record may be impressed, said traverse arm being actuated by the contact of said guide face on one wall of said groove.

5. A recording and reproducing device comprising a magnetic recording and reproducing head having a two-faced contacting foot, one face being a non-activated wear-resisting guide face adapted to rest upon and make surface contact with one wall surface of an angular groove in the surface of a body adapted for a magnetic record, the other face of said contacting foot being a magnetic recording-reproducing face, said face being disposed at an angle to said guide face, said angle conforming substantially to the angle between the opposite walls of the groove in said record body, a traverse arm arranged to support said head over the said grooved body upon which the magnetic record may be impressed, said traverse arm being actuated by the contact of said guide face on one wall of said groove, and means for laterally adjusting the positioning of the foot of said head with reference to one or the other wall of said groove.

6. A magnetic recording and reproducing head having a two-faced contacting foot, one face being a non-activated wear-resisting guide face adapted to rest upon and make surface contact with one wall surface of an angular groove in the surface of a body adapted for a magnetic record, and the other face of said contacting foot being a magnetic recording-reproducing face, said face being disposed at an angle to said guide face, said angle conforming substantially to the angle between the opposite walls of the groove in said record body.

References Cited in the file of this patent

UNITED STATES PATENTS

| | | |
|---|---|---|
| 2,361,753 | Eilenberger | Oct. 31, 1944 |
| 2,581,765 | Mann | Jan. 8, 1952 |
| 2,721,906 | Sharpe | Oct. 23, 1955 |